United States Patent [19]

Alfekri

[11] Patent Number: 5,699,182
[45] Date of Patent: Dec. 16, 1997

[54] LIGHT FATIGUE RESISTANT PHOTOCHROMIC FORMULATIONS

[75] Inventor: Dheya Alfekri, San Diego, Calif.

[73] Assignee: Xytronyx, Inc., San Diego, Calif.

[21] Appl. No.: 450,616

[22] Filed: May 25, 1995

[51] Int. Cl.[6] .................... G02F 1/00; F21V 9/00
[52] U.S. Cl. .................... 359/321; 252/582; 252/586
[58] Field of Search .................... 359/321; 252/582, 252/586, 600; 524/100, 104, 110

[56] References Cited

U.S. PATENT DOCUMENTS

| | | |
|---|---|---|
| 3,134,674 | 5/1964 | Brown . |
| 3,212,898 | 10/1965 | Cerreta et al. . |
| 3,239,366 | 3/1966 | Miller et al. . |
| 3,322,542 | 5/1967 | Ullman et al. . |
| 3,485,764 | 12/1969 | Kazan . |
| 3,488,290 | 1/1970 | Gerhardt et al. . |
| 3,508,810 | 4/1970 | Baltzer . |
| 3,519,635 | 7/1970 | Meriwether et al. . |
| 3,522,143 | 7/1970 | Motter . |
| 3,562,172 | 2/1971 | Ono et al. . |
| 3,565,814 | 2/1971 | Pellon . |
| 3,578,602 | 5/1971 | Ono et al. . |
| 3,625,731 | 12/1971 | Taylor et al. . |
| 3,635,544 | 1/1972 | Stamm et al. . |
| 3,660,094 | 5/1972 | Poot . |
| 3,666,352 | 5/1972 | Wagner et al. . |
| 3,671,543 | 6/1972 | Koga et al. . |
| 3,679,351 | 7/1972 | Weissbein et al. . |
| 3,707,347 | 12/1972 | Mueller et al. . |
| 3,794,513 | 2/1974 | Krafft et al. . |
| 3,843,550 | 10/1974 | Hinnen . |
| 3,950,356 | 4/1976 | Hinnen . |
| 4,012,232 | 3/1977 | Uhlmann et al. . |
| 4,025,673 | 5/1977 | Reinnagel . |
| 4,046,586 | 9/1977 | Uhlmann et al. . |
| 4,046,737 | 9/1977 | Holt et al. . |
| 4,049,647 | 9/1977 | Holt et al. . |
| 4,130,760 | 12/1978 | Fanselow et al. . |
| 4,166,043 | 8/1979 | Uhlmann et al. . |
| 4,171,980 | 10/1979 | Ceintrey . |
| 4,172,725 | 10/1979 | Ceintrey . |
| 4,215,010 | 7/1980 | Hovey et al. . |
| 4,237,207 | 12/1980 | Ceintrey . |
| 4,289,497 | 9/1981 | Hovey . |
| 4,342,668 | 8/1982 | Hovey et al. . |
| 4,360,653 | 11/1982 | Stevens et al. . |
| 4,440,672 | 4/1984 | Chu . |
| 4,485,168 | 11/1984 | Arakawa et al. . |
| 4,503,177 | 3/1985 | Reid et al. . |
| 4,630,553 | 12/1986 | Landheer . |
| 4,637,698 | 1/1987 | Kwak et al. . |
| 4,693,962 | 9/1987 | Tamura et al. . |
| 4,699,473 | 10/1987 | Chu . |
| 4,720,356 | 1/1988 | Chu .................... 252/586 |
| 4,720,547 | 1/1988 | Kwak et al. . |
| 4,792,224 | 12/1988 | Kwiatkowski et al. . |
| 4,794,068 | 12/1988 | Miyazaki et al. . |
| 4,812,171 | 3/1989 | Brettle et al. . |
| 4,927,180 | 5/1990 | Trundle et al. . |
| 4,962,013 | 10/1990 | Tateoka et al. . |
| 4,992,347 | 2/1991 | Hawkins et al. . |
| 4,994,208 | 2/1991 | McBain et al. . |
| 5,017,225 | 5/1991 | Nakanishi et al. . |
| 5,017,698 | 5/1991 | Machida et al. . |
| 5,028,047 | 7/1991 | Lee et al. . |
| 5,130,058 | 7/1992 | Tanaka et al. . |
| 5,130,353 | 7/1992 | Fischer et al. . |
| 5,180,524 | 1/1993 | Cailli et al. . |
| 5,200,116 | 4/1993 | Heller . |
| 5,208,132 | 5/1993 | Kamada et al. . |
| 5,225,113 | 7/1993 | Busetto et al. . |
| 5,242,624 | 9/1993 | Malatesta et al. . |
| 5,260,135 | 11/1993 | Corrigan et al. .................... 428/416 |
| 5,289,547 | 2/1994 | Ligas et al. . |
| 5,330,686 | 7/1994 | Smith et al. . |
| 5,385,962 | 1/1995 | Corrigan et al. .................... 523/414 |
| 5,389,219 | 2/1995 | Zwack et al. .................... 204/181.1 |
| 5,391,327 | 2/1995 | Ligas et al. .................... 252/586 |

FOREIGN PATENT DOCUMENTS

| | | |
|---|---|---|
| 0 227 337 | 1/1986 | European Pat. Off. . |
| 49-33180 | 3/1974 | Japan . |
| 59-105058 | 6/1984 | Japan . |
| 62-11743 | 1/1987 | Japan . |
| 62-293489 | 12/1987 | Japan . |
| 4-63871 | 2/1992 | Japan . |
| 88/06306 | 8/1988 | WIPO . |
| 94/08260 | 4/1994 | WIPO . |

OTHER PUBLICATIONS

Chu N., "Innovative Concepts for the Solar Building Program Evaluation of Photchromic Plastics," Final Report for Period Oct. 1987—Sep. 1988, Precision Products Business, American Optical Corporation, Oct. 1988.

*Primary Examiner*—Mark Hellner
*Attorney, Agent, or Firm*—Lyon & Lyon LLP

[57] ABSTRACT

The present invention provides for light fatigue resistant photochromic compositions including a unique combination of hindered aminoether light stabilizer ("HAELS") compounds to extend the usable lifetime of naphthopyran photochromic compositions and articles. Additionally, light stabilizer compounds and hydroxyphenyl benzotriazole UV absorbers have a synergistic effect in extending the usable lifetime of photochromic compositions and articles. Specifically, certain tertiary and secondary amine HALS compounds in combination with hydroxyphenyl benzotriazole UV absorbers extend the usable lifetime of spiro-indolino-oxazine photochromic compositions and articles. Similarly, aminoether HAELS compounds in combination with hydroxyphenyl benzotriazole UV absorbers further extend the usable lifetime of the naphthopyran photochromic compositions and articles.

37 Claims, No Drawings

LIGHT FATIGUE RESISTANT PHOTOCHROMIC FORMULATIONS

FIELD OF THE INVENTION

The invention relates to a photochromic composition with enhanced light fatigue resistance (i.e., greater resistance to light fatigue than the photochromic compound alone), particularly an organic photochromic composition consisting of: (1) a spiro-indolino-oxazine or naphthopyran photochrome; (2) formulated with a structure-specific hindered amine or aminoether light stabilizer respectively; and (3) in some cases monomeric and dimeric UV absorbers from the hydroxyphenyl benzotriazole chemical family.

BACKGROUND OF THE INVENTION

The following is a discussion of background art, none of which is admitted to be prior art to the present invention.

Photochromes are compounds that undergo a reversible, light-induced isomerization to a structure with a chromophore in the visible region of the electromagnetic spectrum. If exposed to ultraviolet (UV) light from sunlight or that produced by artificial UV sources such as mercury vapor or xenon arc lamps, the molecules will absorb energy and form a colored species. When the source of UV light is removed, the compound reverts within minutes to its colorless state. This type of process has been described for a number of classes of organic compounds and has found some utility in applications where a short term reversible color change is desired. Organic photochromic compounds include members of the spiro-indolino-oxazine and naphthopyran families.

A significant limitation to the commercial application of these compounds is their tendency to irreversibly deteriorate after repeated exposure to UV light, a phenomenon known as light fatigue. Thermal, photochemical and oxidative decomposition mechanisms of either the photochrome or substances associated with the photochrome have been postulated to play a role in light fatigue. The UV-induced ring opening that produces a chromophore in the visible light spectrum and the side reaction resulting in light fatigue are outlined for a representative spiro-indolino-oxazine structure shown in reaction 1. An analogous ring opening pathway applies to the naphthopyran photochromes.

Stabilization of naphthopyran photochromic mixtures by incorporating an asymmetric diaryloxamide (WO 94/08260) improves slightly the fatigue resistance of photochromic compounds. There still remains a need to improve the light fatigue resistance capabilities so that products containing naphthopyran photochromic compositions can attain useful service lives.

SUMMARY OF THE INVENTION

The present invention provides for light fatigue resistant photochromic compositions including a unique combinations of HALS compounds and hydroxyphenyl benzotriazole UV absorbers that have a synergistic effect in extending the usable lifetime of photochromic compositions and articles. Specifically, certain tertiary and secondary amine HALS compounds in combination with hydroxyphenyl benzotriazole UV absorbers extend the usable lifetime of spiro-indolino-oxazine photochromic compositions and articles. Additionally, hindered aminoether light stabilizer ("HAELS") compounds by themselves suprisingly extend the usable lifetime of naphthopyran photochromic compositions and articles. Similarly, aminoether HAELS compounds in combination with hydroxyphenyl benzotriazole UV absorbers further extend the usable lifetime of the naphthopyran photochromic compositions and articles.

While aminoether HAELS act as light stabilizers for naphthopyran photochromic materials, these materials do not provide stability to spiro-indolino-oxazine photochromes. Conversely, as previously disclosed in WO 94/08260, tertiary and secondary amine HALS do not provide any significant stabilization benefit to naphthopyran photochromic materials. The light fatigue resistance of spiro-indolino-oxazine photochromic compositions was found to be improved by formulating these compounds with a secondary or tertiary amine HALS compounds as previously reported, but it was determined that the stabilization is substantially enhanced through incorporation of at least one hydroxyphenyl benzotriazole UV light absorber.

The present invention shows that certain types of secondary and tertiary amine HALS stabilize the spiro-indolino-oxazine compounds and certain aminoether HAELS stabilize the napthopyran compounds when homogenously dispersed in the photochromic mixture, thus avoiding the expense of microencapsulation. Furthermore, it was discov- Reaction 1

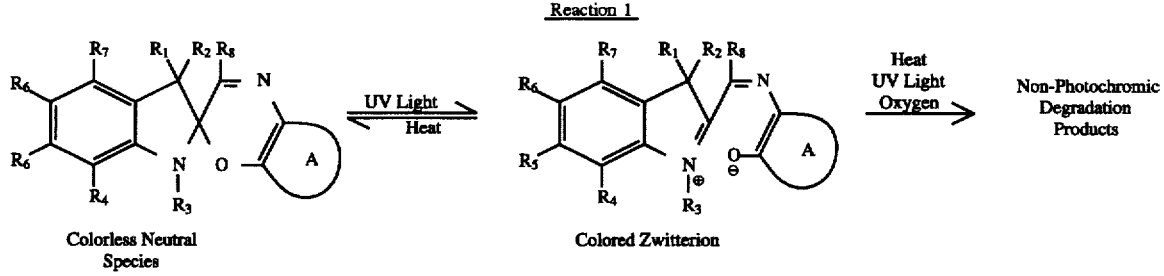

In U.S. Pat. No. 5,242,624, an amine plus a hindered amine light stabilizer (HALS) were combined in a photochromic material to stabilize spiro-indolino-oxazine photochromic materials. Several examples of HALS-stabilized spiro-indolino-oxazine compositions exist. For instance, U.S. Pat. Nos. 5,208,132 and 5,017,225 claim stabilized photochromic materials that require special microencapsulation technology for efficacy.

ered that combining secondary and tertiary amine HALS with the spiro-indolino-oxazine photochromes or aminoether HAELS with napthopyran photochromes along with certain UV absorbers from the benzotriazole family gave a synergistic stabilization in excess of the stabilization afforded by the individual light stabilizer or benzotriazole UV absorbers alone. This synergy was not observed when combining the spiro-indolino-oxazine photochromes, appro-

DESCRIPTION OF THE PREFERRED EMBODIMENTS

I. Spiro-indolino-oxazine

A. General Structure

Photochromic spiro-indolino-oxazine compounds of the invention have the general structural formula (I):

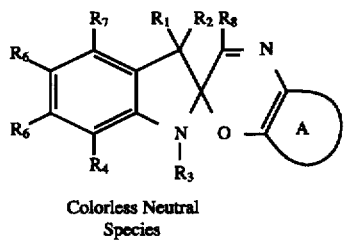

Colorless Neutral Species where:

$R_1$ and $R_2$, either the same or different, each represent independently a $C_1$–$C_5$ alkyl group, linear or branched; a phenyl group; or $R_1$ and $R_2$ together with the carbon atom to which they are connected, jointly represent a cycloalkyl ($C_4$–$C_7$) group;

$R_3$ represents a hydrogen atom; a $C_1$–$C_5$ alkyl group, linear or branched; a similar $C_1$–$C_5$ alkyl group substituted with from 1 to 5 halogen atoms chosen from fluorine, chlorine, bromine or iodine, hydroxy groups, $C_1$–$C_5$ alkoxy groups, $C_1$–$C_5$ carboxy alkyl groups, cyano groups; a $C_2$–$C_5$ alkenyl group; a phenyl group; or benzyl group;

from $R_4$ to $R_7$, either the same or different, each stand independently for a hydrogen atom; a $C_1$–$C_5$ alkyl group, linear or branched; a similar $C_1$–$C_5$ alkyl group substituted with from 1 to 5 halogen atoms chosen from fluorine, chlorine, bromine or iodine, hydroxy groups, $C_1$–$C_5$ alkoxy groups, $C_1$–$C_5$ carboxy alkyl groups, cyano groups; a $C_2$–$C_5$ alkenyl group; a phenyl group; a benzyl group; a halogen atom chosen from either fluorine, chlorine, bromine or iodine; a hydroxy group; a $C_1$–$C_5$ alkoxy group; an amino group; a monoalkyl ($C_1$–$C_5$) amino group; a di-alkyl ($C_1$–$C_5$) amino group; a cyclo-alkyl ($C_3$–$C_{10}$) amino group; a piperidine, piperazine or morpholine group; a carboxyl group; a carboxy alkyl ($C_1$–$C_5$) group; a carboxy alkenyl ($C_2$–$C_5$) group; a carboxamide group; a substituted carboxamide N-alkyl ($C_1$–$C_5$) group; a substituted carboxamide N,N-di-alkyl ($C_1$–$C_5$) group; a cyano group; a nitro group; a sulfonic group; a ($C_1$–$C_5$) alkyl sulfonic group; an aryl sulfonic group chosen from benzene sulfonic, p-toluene sulfonic, p-chlorotoluene sulfonic groups; an aryl group chosen from phenyl, biphenyl, naphthyl groups;

$R_8$ represents a hydrogen atom; a linear or branched alkyl ($C_1$–$C_5$) group; a phenyl group; a halogen atom chosen from either fluorine, chlorine, bromine; an alkoxy ($C_1$–$C_5$) group; or a phenoxy group;

A represents an arenic, monocyclic or polycyclic group, chosen from those that can be defined with formula (II), (III), (IV) or (V):

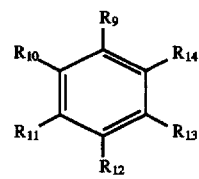

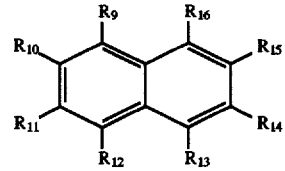

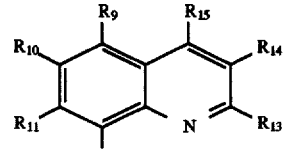

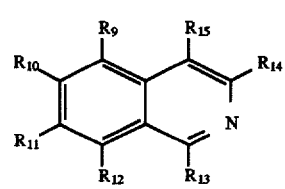

two contiguous points from $R_9$ to $R_{12}$ represent the condensation position between the oxazinic nucleus in the general formula (I) and the other two groups in addition to $R_{13}$–$R_{16}$ have the same meaning as $R_4$–$R_7$ in the general formula (I).

B. Preferred Substitutents

Preferably in formula (I):

$R_1$ and $R_2$, either the same or different, each represent independently a methyl, ethyl, propyl or phenyl group, or together with the carbon atom to which they are connected, jointly represent a cyclohexyl group;

$R_3$ represents a methyl, ethyl, propyl, phenyl, benzyl, 2-allyl, 2-hydroxyethyl or 2-carboxymethylethyl group;

from $R_4$ to $R_7$, either the same or different, each stand independently for the hydrogen atom, a fluorine, chlorine or bromine atom, or a methyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group;

$R_8$ represents the hydrogen atom, the chlorine atom, methyl, phenyl, or methoxy group; and/or A is one of the groups with formula (II), (III), (IV) or (V) where:

two contiguous points from $R_9$ to $R_{12}$ represent the condensation position between the oxazinic nucleus in the general formula (I) and the other two groups in addition to $R_{13}$–$R_{16}$ each represent independently the hydrogen atom, a fluorine, chlorine or bromine atom, or a methyl, ethyl, propyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group.

C. Specific Examples

Specific examples of preferred spiro-indolino-oxazine photochromic compounds according to the present invention are:

1',3'-dihydro-5,7-dimethoxy-1'n-propyl-3'-ethyl-3',4',5'-(and 3',5',5')-trimethyl-spiro[2H-1,4-benzoxazine-2,2'-[2H]indole](VI);

1,3-dihydro-1,3,3,4,5 (and 1,3,3,5,6)-pentamethylspiro[2H-indole-2,3'-[3H]pyrido[3,2-f][1,4]benzoxazine](VII);
1,3-dihydro-1,3,3,4,5(and 1,3,3,5,6)-pentamethylspiro[2H-indole-2,3'-[3H]naphth [2,1-b][1,4]oxazine (VIII):

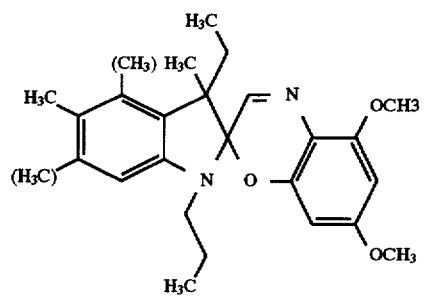

(VI)

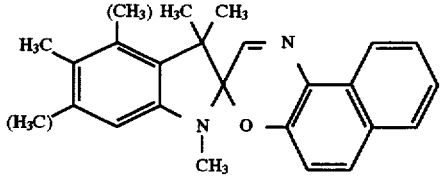

(VII)

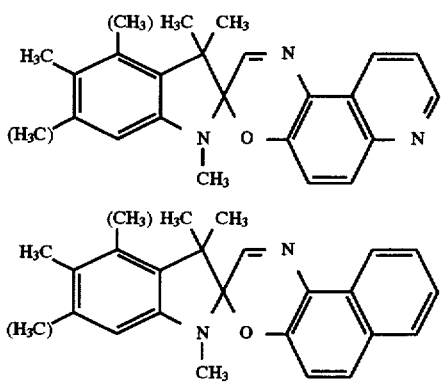

(VIII)

II. Naphthopyrans

A. General Structure

Naphthopyran photochromic compounds usually have the general structural formula (IX):

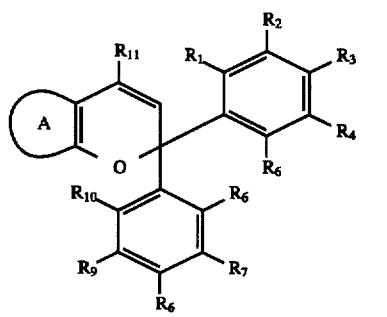

(IX)

where:

$R_1$ to $R_{11}$, either the same or different, each stand independently for a hydrogen atom; a $C_1$–$C_5$ alkyl group, linear or branched; a similar $C_1$–$C_5$ alkyl group substituted with from 1 to 5 halogen atoms chosen from fluorine, chlorine, bromine or iodine, hydroxy groups, $C_1$–$C_5$ alkoxy groups, $C_1$–$C_5$ carboxy alkyl groups, cyano groups; a $C_2$–$C_5$ alkenyl group; a phenyl group; a benzyl group; a halogen atom chosen from either fluorine, chlorine, bromine or iodine; a hydroxy group; a $C_1$–$C_5$ alkoxy group; an amino group; a monoalkyl ($C_1$–$C_5$) amino group; a di-alkyl ($C_1$–$C_5$) amino group; a cyclo-alkyl ($C_3$–$C_{10}$) amino group; a piperidine, piperazine or morpholine group; a carboxyl group; a carboxy alkyl ($C_1$–$C_5$) group; a carboxy alkenyl ($C_2$–$C_5$) group; a carboxamide group; a substituted carboxamide N-alkyl ($C_1$–$C_5$) group; a substituted carboxamide N,N-di-alkyl ($C_1$–$C_5$) group; a cyano group;

a nitro group; a sulfonic group; a ($C_1$–$C_5$) alkyl sulfonic group; an aryl sulfonic group chosen from benzene sulfonic, p-toluene sulfonic, p-chlorotoluene sulfonic groups; an aryl group chosen from phenyl, biphenyl, naphthyl groups;

A represents an arenic polycyclic group, chosen from those that can be defined with formula (X):

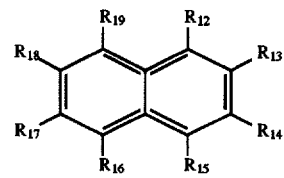

(X)

two contiguous points from $R_{12}$ to $R_{15}$ represent the condensation position between the pyran nucleus in the general formula (IX) and the other two groups in addition to $R_{16}$–$R_{19}$ have the same meaning as $R_1$–$R_{11}$ in the general formula (IX).

B. Preferred Substituents

Preferably in formula (IX):

$R_1$ to $R_{11}$, either the same or different, each stand independently for the hydrogen atom, a fluorine, chlorine or bromine atom, or a methyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group;

A is one of the groups with formula (X) where:

two contiguous points from $R_{12}$ to $R_{15}$ represent the condensation position between the pyran nucleus in the general formula (IX) and the other two groups in addition to $R_{16}$–$R_{19}$ each represent independently the hydrogen atom, a fluorine, chlorine or bromine atom, or a methyl, ethyl, propyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro or phenyl group.

C. Specific Examples

Specific examples of preferred naphtopyran photochromic compounds according to the present invention are:

3,3-diphenyl-3H-naphtho[2,1-b]pyran (XI);
3-(2-fluorophenyl)-3-(3-methyl-4-methoxyphenyl)-5-acetoxy-3H-naphtho[2,1-b]pyran (XII):

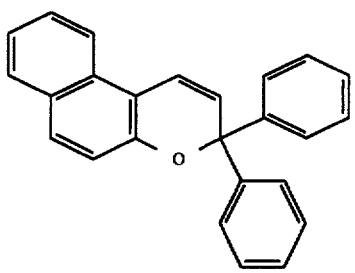

(XI)

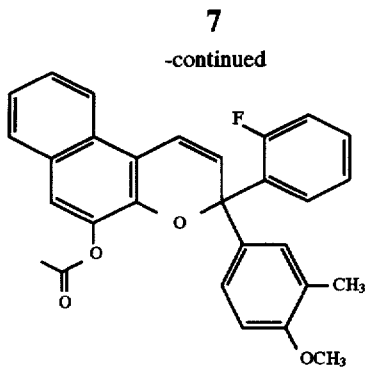

(XII)

3(2-fluorophenyl)-3(4-methoxyphenyl)-3H-naphtho[2,1-b]pyran;

3(2-fluorophenyl)-3(4'-methoxyphenyl)-8-methoxy-3H-naptho[2,1-b]-pyran;

3(2,4-dimethoxyphenyl)-3,4'-methoxyphenyl)-3H-naphtho[2,1-b]-pyran;

3(2-fluorophenyl-3(3,4-dimethoxyphenyl)3H-naphtho[2,1-b]pyran;

3(2-methyl-4-methoxyphenyl)-3(4-methoxyphenyl)-3H-naphtho[2,1-b]pyran;

3(2-methylphenyl)-3(4-methoxyphenyl)-3H-naphtho[2,1-b]pyran;

3-phenyl-3(2,4-dimethoxyphenyl)-3H-naphtho[2,1-b]pyran; and

3(2,6-difluorophenyl)-3(4-methoxyphenyl)-3H-naphtho[2,1-b]-pyran.

This invention reports formulations using stabilizers from the HALS, HAELS and hydroxyphenyl benzotriazole families to enhance the usable lifetime of the photochromic articles. The proper choice of each type of stabilizer included careful consideration of the chemical compatibility of the photochromic materials to be stabilized, the concentration of each component used and the UV absorbing properties of the compounds, so as not to interfere with the UV-induced ring opening reaction shown in reaction 1. For example, the use of secondary and tertiary HALS with naphthopyran photochromes was actually deleterious to the stability of these compounds.

III. HALS and HAELS

A. General Structure

The light stabilizer compounds utilized in this invention are usually selected from the group of secondary and tertiary amine HALS structures (XIIIa and XIIIb) or aminoether HAELS structures (XIVa and XIVb):

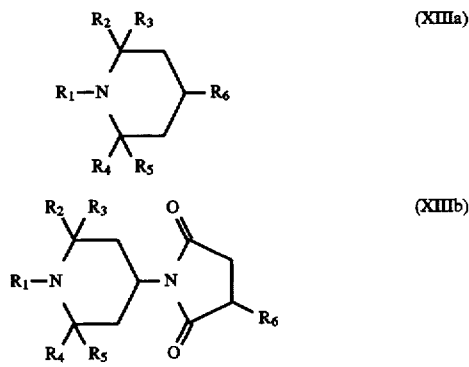

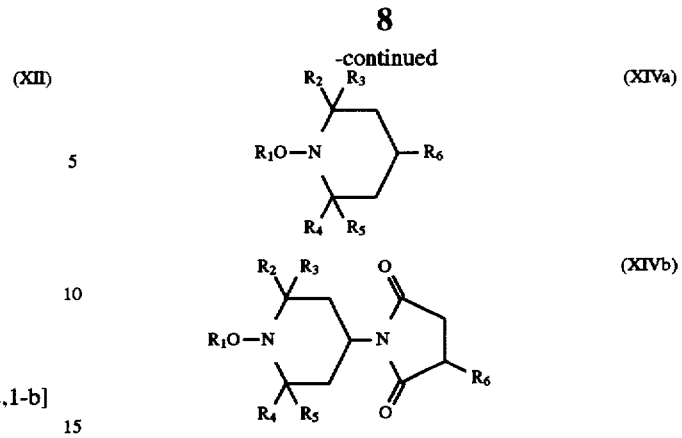

where:

$R_1$ represents a hydrogen atom; a linear or branched alkyl ($C_1$–$C_{10}$) group; a phenyl group; a $C_1$–$C_4$ acyl group (preferably an acetyl group);

from $R_2$ to $R_5$, either the same or different, each stand independently for a hydrogen atom; a $C_1$–$C_5$ alkyl group, linear or branched; a similar $C_1$–$C_5$ alkyl group substituted with from 1 to 5 halogen atoms chosen from fluorine, chlorine, bromine or iodine, hydroxy groups, $C_1$–$C_5$ alkoxy groups; a ($C_1$–$C_5$) alkyl sulfonic group; an aryl sulfonic group chosen from benzene sulfonic, p-toluene sulfonic, p-chlorotoluene sulfonic groups; an awl group chosen from phenyl, biphenyl, naphthyl groups; and $R_6$ represents a hydrogen atom, a $C_1$–$C_4$ acyl group (preferably an acetyl group), a linear or branched alkyl ($C_1$–$C_{16}$) group, a similar $C_1$–$C_{16}$ alkyl group substituted with from 1 to 5 halogen atoms chosen from fluorine, bromine or iodine, hydroxy groups, $C_1$–$C_5$ alkoxy groups; a ($C_1$–$C_5$) alkyl sulfonic group; an aryl sulfonic group chosen from benzene sulfonic, p-toluene sulfonic, p-chlorotoluene sulfonic groups; an aryl group chosen from phenyl, biphenyl, naphthyl groups; a hydroxy group; an acyloxy group; an alkoxy group; a bridging moiety linking the light stabilizer in a dimer, trimer or tetramer structure; and a linker to a polymer.

Other hindered amine light stabilizers may be known in the art or conceived of in the future and thus additional aminoether light stabilzer compounds may be made by those skilled in the art by modifying the amine group to an amino-ether group.

B. Preferred Substituents

Preferably in structures XIIIa, XIIIb, XIVa, and XIVb:

$R_1$ represents a linear or branched alkyl ($C_1$–$C_{10}$) group;

from $R_2$ to $R_5$, either the same or different, each stand independently for a $C_1$–$C_5$ alkyl group, linear or branched; and $R_6$ represents a hydrogen atom, a $C_1$–$C_4$ acetyl group, a linear or branched alkyl ($C_1$–$C_{16}$) group, or a hydroxyl group acylated to form a bis-succinate, glutarate, adipate, pimelate, suberate, azelate, sebacacate, or phthalate.

C. Specific Examples

Specific examples of preferred HALS and HAELS compounds according to the present invention are:

bis(1,2,2,6,6-pentamethyl-4-piperidinyl)sebacate (Tinuvin 292, Ciba-Geigy, Hawthorne, N.Y.) (XVa);

1-methyl-4-(3-dodecy)-2,5-dioxo-1-pyrrolidinyl)-2,2,6,6-tetramethylpiperidine (Sanduvor 3056, Sandoz, Charlotte, N.C.)(XVb)

bis(2,2,6,6-tetramethyl-4-piperidinyl)sebacate (Tinuvin 770, Ciba-Geigy, Hawthorne, N.Y.) (XVIa);

4-(3-dodecyl-2,5-dioxo-1-pyrrolidinyl-2,2,6,6-tetramethylpiperidine (Sanduvor 3055, Sandoz, Charlotte, N.C.)(XVIb)

bis-(1-octyloxy-2,2,6,6,tetramethyl-4-piperidinyl)sebacate (Tinuvin 123, Ciba-Geigy, Hawthorne, N.Y.) (XVII):

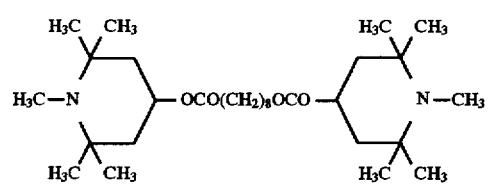 (XVa)

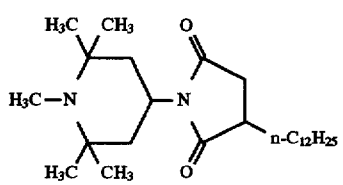 (XVb)

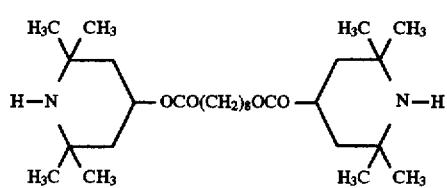 (XVIa)

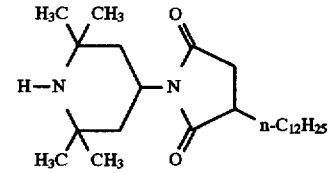 (XVIb)

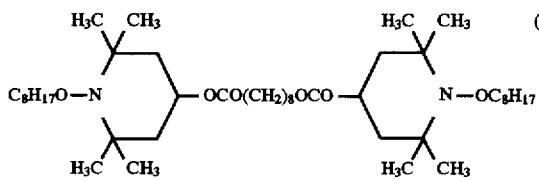 (XVII)

HAELS compounds based on the HALS compounds above can also be used. For example, structures (Xva), (Xvb), (XVIa), and (XVIb) can all be modified by attaching an oxygen atom to the nitrogen atom on the left rings to form suitable aminoether HAELS.

IV. Hydroxyphenyl benzotriazole UV absorbers

A. General Structure

The hydroxyphenyl benzotriazole UV absorbers used in formulations described in this invention are generally represented by the benzotriazole structure (XVIII):

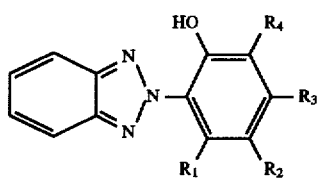 (XVIII)

where:

from $R_1$ to $R_4$, either the same or different, each stand independently for a hydrogen atom; a $C_1$–$C_8$ alkyl group, linear or branched; a similar $C_1$–$C_8$ alkyl group substituted with from 1 to 8 halogen atoms chosen from fluorine, chlorine, bromine or iodine, hydroxy groups, $C_1$–$C_8$ alkoxy groups; a ($C_1$–$C_8$) alkyl sulfonic group; an aryl sulfonic group chosen from benzene sulfonic, p-toluene sulfonic, p-chlorotoluene sulfonic groups; an aryl group chosen from phenyl, biphenyl, naphthyl groups;

Furthermore, $R_1$ to $R_4$ can represent a $C_1$–$C_8$ alkyl group substituted with from 1–8 functional groups chosen from hydroxyl, carboxyl or amino further substituted by a linking group such as polyethylene, polyethylenoxy or aromatic group and optionally terminated in a second hydroxyphenyl benzotriazole group.

B. Preferred Substituents

Preferably in structure (XVIII):

from $R_1$ to $R_4$, either the same or different, each stand independently for a hydrogen atom; a $C_1$–$C_8$ alkyl group, linear or branched; hydroxy groups, $C_1$–$C_8$ alkoxy group; or a $C_1$–$C_8$ alkyl group substituted with from 1–8 functional groups chosen from hydroxyl, carboxyl or amino further substituted by a linking group selected from polyethylene, polyethylenoxy or aromatic group and optionally terminated in a second hydroxyphenyl benzotriazole group.

C. Specific Examples

Specific examples of preferred hydroxyphenyl benzotriazole compounds according to the present invention are:

2-(2H-Benzotriazole-2-yl)-4,6-dipentylphenol (Tinuvin 328, Ciba-Geigy, Hawthorne, N.Y.) (XIX);

Poly (oxy-1,2-ethanediyl), α-(3-(3-(2H-benzotriazol-2-yl)-5-(1,1-dimethylethyl)-4-hydroxyphenyl)-1-oxopropyl)-ω-hydroxy (Component of Tinuvin 1130, Ciba-Geigy, Hawthorne, N.Y.) (XX);

Poly (oxy-1,2-ethanediyl), α-(3-(3-(2H-benzotriazole-2-yl)-5-(1,1-dimethylethyl)-4-hydroxyphenyl)-1-oxopropyl-ω-(3-(3-(2H-benzotriazol-2-yl)-5-(1,1-dimethylethyl)-4-hydroxyphenyl)-1-oxopropoxy) (Component of Tinuvin 1130, Ciba-Geigy, Hawthorne, N.Y.) (XXI):

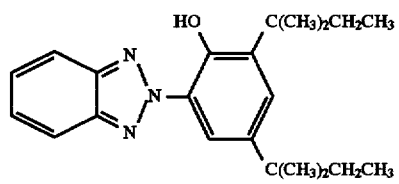 (XIX)

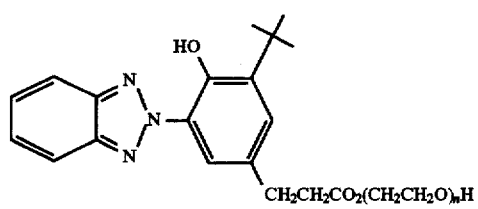 (XX)

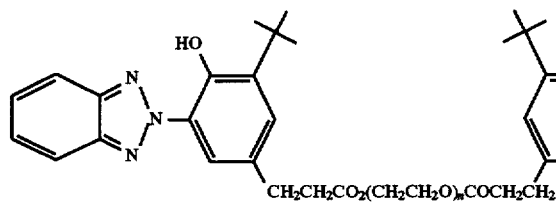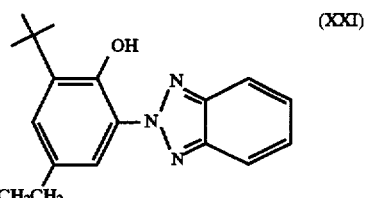

(XXI)

CH₂CH₂CO₂(CH₂CH₂O)ₙCOCH₂CH₂

V. Formulations

The photochrome/light stabilizer/hydroxyphenyl benzotriazole combinations may be formulated in a number of different host materials by methods that have been previously described in the art. The methods include creating a paste by mixing the photochrome, light stabilizer and benzotriazole compounds with heating, vigorous stirring or milling. A suitable thinner such as cyclohexanone, toluene, an alkyl acetate such as propyl acetate, chlorinated alkane such as methylene chloride or petroleum distillates may be added to dissolve or uniformly disperse the photochrome into a host material, and adjust viscosity. The paste is then suitable for the intended application method and applied to the substrate. Examples of host materials that may be used in conjunction with the stabilized photochromic compositions include: polymers, i.e., homopolymers and copolymers, of polyvinyl chloride, polyurethane, polyacrylates, polyalkylacrylates such as polymethylmethacrylate, epoxy, cellulose acetate, cellulose triacetate, cellulose acetate propionate, cellulose acetate butyrate, nitrocellulose, polyvinyl acetate, polycarbonate, polyvinyl alcohol, polyalkylene terphthalate, polystyrene, copolystyrene-methylmethacrylate. Examples of substrates include metals, paper, wood, glass, ceramics, cloth, leather, plastic films or fibers. The incorporation or application of the photochromic materials may be accomplished by conventional techniques such as printing (flexographic, lithographic, silk screening, gravure, rubber stamp), spraying, brushing, dye coating, dipping, knife coating or imbibing. Additionally, the photochromic materials may be combined with a polymeric host material or wax in a pellet form and extruded, injection molded, spin molded, blow molded or similarly shaped by heat and pressure to create the photochromic article. Another mode of incorporating the photochromic compound and stabilizer includes formulating with a suitable adhesive and using the mixture to laminate two polymer films.

EXAMPLES

To further illustrate this invention, the following examples are presented. The examples are non-limiting and are merely presented to illustrate various features of the invention defined in the claims appended hereto. All percentages are by weight.

On the photochromic articles obtained by the methods described herein, the resistance to light fatigue was determined by means of a Q-U-V Accelerated Weathering Tester (Q-Panel Co., Cleveland, Ohio) equipped with UVA-340 lamps calibrated to 0.77 W/m²/nm. This output of ultraviolet light is approximately equivalent to the most intense noon summer sun in the 300–370 nm wavelength range. The stabilized and unstabilized formulations were irradiated in the Q-U-V Accelerated Weathering Tester for a series of 3 hour cycles consisting of two hours of irradiation and one hour of darkness at a temperature of 37° C. Control sections of each sample were protected from irradiation and evaluated side by side with the irradiated portion of the sample. The photochromic activity of the irradiated sample was compared to the non-irradiated sample after a timed exposure under an Oriel Sun Simulator Model Number 68820 (Oriel Corp., Stratford, Conn.). The product lifetime was defined as the amount of total time the sample was irradiated in the Q-U-V Accelerated Weathering Tester and retained ≧70% of the optical density of the non-irradiated control sample. A stability factor was calculated in some of the examples by dividing the product lifetime of a particular stabilized formulation by the product lifetime of the corresponding unstabilized formulation.

EXAMPLE 1: Improved Q-U-V Stability of Spirooxazines (SO) with HALS and Napthopyrans (NP) with HAELS A series of photochromic formulations were prepared by combining 2.5% photochromic compound, 20% of either Tinuvin 292 (compound XV, Ciba-Geigy, Hawthorne, N.Y.) Sanduvor 3056 (compound XVb, Sandoz, Charlotte, N.C.), Tinuvin 770 (compound XVI, Ciba-Geigy, Hawthorne, N.Y.), Sanduvor 3055 (compound XVIb, Sandoz, Charlotte, N.C.) or Tinuvin 123 (compound XVII, Ciba-Geigy, Hawthorne, N.Y.) and 77.5% Wilflex® MCV-FF Base (Flexible Products, Kennesaw, Ga.), a polyvinyl chloride plastisol. Another series of unstabilized formulations were prepared by combining 2.5% photochromic compound and 97.5% Wilflex® MCV-FF Base. All the formulations were silk screen printed onto cotton fabric using an 83 mesh screen. A summary of the results of the Q-U-V Accelerated Weathering Tester data for these formulations are shown below in Table 1. The results indicate the high degree of correlation between extended product lifetime and the appropriate light stabilizer/photochrome combination used in the formulation. In particular, the spiro-indolino-oxazine (SO) photochromic compounds are stabilized at least 5.0 to 14.9 times longer with amine HALS compared with unstabilized photochromic formulations or photochromic formulations stabilized with aminoether HAELS. Conversely, naphthopyran photochromes are stabilized at least 8.4 times longer with aminoether HAELS compared to unstabilized photochromic formulations or photochromic formulations stabilized with amine HALS.

TABLE 1

| Photo-chromic Compound | Photo-chromic Family[1] | Light Stabilizer Compound | Light Stabilizer Family | Q-U-V Stability (hours) | Stability Factor[2] |
|---|---|---|---|---|---|
| VI | SO | None | — | 15 | 1.0 |
| VI | SO | XVa | HALS | 209 | 13.9 |
| VI | SO | XVb | HALS | 270 | 18.0 |
| VI | SO | XVIa | HALS | 209 | 13.9 |
| VI | SO | XVIb | HALS | 150 | 10.0 |
| VI | SO | XVII | HAELS | 15 | 1.0 |
| VII | SO | None | — | 15 | 1.0 |

TABLE 1-continued

| Photo-chromic Compound | Photo-chromic Family[1] | Light Stabilizer Compound | Light Stabilizer Family | Q-U-V Stability (hours) | Stability Factor[2] |
|---|---|---|---|---|---|
| VII | SO | XVa | HALS | 209 | 13.9 |
| VII | SO | XVb | HALS | 108 | 7.2 |
| VII | SO | XVIa | HALS | 224 | 14.9 |
| VII | SO | XVIb | HALS | 75 | 5.0 |
| VII | SO | XVII | HAELS | 25 | 1.7 |
| VIII | SO | None | — | 15 | 1.0 |
| VIII | SO | XVa | HALS | 209 | 13.9 |
| VIII | SO | XVb | HALS | 140 | 9.3 |
| VIII | SO | XVIa | HALS | 209 | 13.9 |
| VIII | SO | XVIb | HALS | 90 | 6.0 |
| VIII | SO | XVII | HAELS | 25 | 1.7 |
| XI | NP | None | — | 25 | 1.0 |
| XI | NP | XVa | HALS | 20 | 0.8 |
| XI | NP | XVb | HALS | 20 | 0.8 |
| XI | NP | XVIa | HALS | 20 | 0.8 |
| XI | NP | XVIb | HALS | 20 | 9.8 |
| XI | NP | XVII | HAELS | 209 | 8.4 |
| XII | NP | None | — | 22 | 1.0 |
| XII | NP | XVa | HALS | 20 | 0.9 |
| XII | NP | XVb | HALS | 20 | 0.9 |
| XII | NP | XVIa | HALS | 20 | 0.9 |
| XII | NP | XVIb | HALS | 20 | 0.9 |
| XII | NP | XVII | HAELS | 209 | 9.5 |

[1]SO = spiro-indolino-oxazine; NP = naphthopyran.
[2]Stability Factor was calculated by dividing the Q-U-V Stability (hours) of a particular formulation by the stability of the formulation in each group that contained no HALS.

EXAMPLE 2: Synergistic Improvement of Q-U-V Stability

A series of photochromic formulations using the blue photochrome (compound VII) and the red photochrome (compound XII) were prepared by combining 2.5% photochromic compound and formulating with or without Tinuvin 1130 (mixture of compounds XX and XXI, Ciba-Geigy, Hawthorne, N.Y.), Tinuvin 328 (compound XIX, Ciba Geigy, Hawthorne, N.Y.) and either Tinuvin 292 (compound XV, Ciba-Geigy, Hawthorne, N.Y.), Sanduvor 3056 (compound XVa, Sandoz, Charlotte, N.C.) or Tinuvin 123 (compound XVII, Ciba-Geigy, Hawthorne, N.Y.) as outlined in Table 2 below. In all cases, the balance of the formulation was Wilflex® MCV-FF Base (Flexible Products, Kennesaw, Ga.), a polyvinyl chloride plastisol. All the formulations were silk screen printed onto cotton fabric using an 83 mesh screen. A summary of the results of the Q-U-V Accelerated Weathering Tester data for these formulations are shown below in Table 2. The results demonstrate the high degree of synergy resulting in extended product lifetime when the appropriate light stabilizer/UV absorber/photochrome combination was used. In particular, the spiro-indolino-oxazine (SO) photochromic compounds was stabilized 13.9 times longer with amine HALS, 3.1 times longer by the use of Tinuvin 1130 and 2.2 times longer by the use of Tinuvin 328. The total degree of stability enhancement, 47.0 fold, when all of these are combined demonstrates that the compounds act synergistically. Similarly, the red naphthopyran photochrome was stabilized 9.5 times longer with aminoether HAELS, 5.2 times longer by the use of Tinuvin 1130 and Tinuvin 328 together. The total degree of stability enhancement, 21.4 fold, when all of these are combined demonstrates that the compounds act synergistically for the naphthopyran system as well.

TABLE 2

| % VII | % Light Stabilizer XVa | % UV Blocker XX and XXI | % UV Blocker XIX | % PVC Plastisol | Q-U-V Stability (hours) | Stability Factor[1] |
|---|---|---|---|---|---|---|
| 2.5 | 0.0 | 0.0 | 0.0 | 97.5 | 15 | 1.0 |
| 2.5 | 20.0 | 0.0 | 0.0 | 77.5 | 209 | 13.9 |
| 2.5 | 0.0 | 2.0 | 0.0 | 95.5 | 46 | 3.1 |
| 2.5 | 0.0 | 0.0 | 1.0 | 96.5 | 33 | 2.2 |
| 2.5 | 20.0 | 2.0 | 1.0 | 74.5 | 705 | 47.0 |

| % VII | % Light Stabilizer XVb | % UV Blocker XX and XXI | % UV Blocker XIX | % PVC Plastisol | Q-U-V Stability (hours) | Stability Factor[1] |
|---|---|---|---|---|---|---|
| 2.5 | 0.0 | 0.0 | 0.0 | 97.5 | 15 | 1.0 |
| 2.5 | 20.0 | 0.0 | 0.0 | 77.5 | 108 | 7.2 |
| 2.5 | 0.0 | 2.0 | 0.0 | 95.5 | 46 | 3.1 |
| 2.5 | 0.0 | 0.0 | 1.0 | 96.5 | 33 | 2.2 |
| 2.5 | 20.0 | 2.0 | 1.0 | 74.5 | 375 | 25.0 |

| % XII | % Light Stabilizer XVII | % UV Blocker XX and XXI | % UV Blocker XIX | % PVC Plastisol | Q-U-V Stability (hours) | Stability Factor[1] |
|---|---|---|---|---|---|---|
| 2.5 | 0.0 | 0.0 | 0.0 | 97.5 | 22 | 1.0 |
| 2.5 | 20.0 | 0.0 | 0.0 | 77.5 | 209 | 9.5 |
| 2.5 | 0.0 | 2.0 | 1.0 | 95.5 | 115 | 5.2 |
| 2.5 | 20.0 | 2.0 | 1.0 | 96.5 | 472 | 21.4 |

[1]Stability Factor was calculated by dividing the Q-U-V Stability (hours) of a particular formulation by the stability of the formulation in each group that contained no HALS, HAELS or UV absorbers.

EXAMPLE 3: Cellulosic/Acrylic Formulation

Stabilized photochromic formulations containing either a spiro-indolino-oxazine or a naphthopyran were prepared as follows: The blue spiro-indolino-oxazine photochrome (compound VII, 0.25 g) was combined with 2.00 g of Tinuvin 292 (compound XVa, Ciba-Geigy, Hawthorne, N.Y.), 0.20 g of Tinuvin 1130 (mixture of compounds XX and XXI, Ciba-Geigy, Hawthorne, N.Y.), 0.10 g of Tinuvin 328 (compound XIX, Ciba Geigy, Hawthorne, N.Y.) and added to 7.45 g of Nazdar 9727 (Naz-Dar, Chicago, Ill.), a cellulosic/acrylic polymeric host. The mixture was stirred with a spatula until homogenous. In a similar fashion, the red naphthopyran photochrome (compound XII, 0.25 g) was combined with 2.00 g Tinuvin 123 (compound XVII, Ciba-Geigy, Hawthorne, N.Y.), 0.20 g of Tinuvin 1130, 0.10 g of Tinuvin 328 and added to 7.45 g of Nazdar 9727. The mixture was stirred with a spatula until homogenous. The corresponding unstabilized formulations were prepared by mixing 0.25 g of either the blue photochrome (compound VII) or the red photochrome (compound XII) with 9.75 g of Nazdar 9727. Each of the four mixtures was applied on a silk screen (mesh #83) and printed on a Tyvek® (DuPont, Wilmington, Del.) non-woven fiber substrate. The coating was cured at 120° C. for 2 minutes. Photochromism of the articles (UV-induced change from colorless to blue or red) was confirmed for all the printed articles and their stability determined in the Q-U-V Accelerated Weathering Tester. The results indicate a 23.9 fold increase in stability for the blue spiro-indolino-oxazine formulation and a 7.1 fold stability enhancement for the naphthopyran formulation when the appropriate light stabilizer and UV absorbers are incorporated.

TABLE 3

| Formulation | Q-U-V Stability (hours) | Stability Factor |
| --- | --- | --- |
| Unstabilized VII (blue) | 8 | 1.0 |
| Stabilized VII (blue) | 191 | 23.9 |
| Unstabilized XII (red) | 24 | 1.0 |
| Stabilized XII (red) | 170 | 7.1 |

EXAMPLE 4: Polyurethane/Polyacrylic Formulation

In a similar manner to that outlined in Example 3, the following stabilized formulations were prepared: blue photochrome (compound VII, 0.25 g) was mixed to homogeneity with 2.00 g of Tinuvin 292, 0.20 g of Tinuvin 1130, 0.10 g of Tinuvin 328 and added to 7.45 g of Nazdar Clear 246660 (Naz-Dar, Chicago, Ill.), a polyurethane/polyacrylic host material. Also, the red photochrome (compound XII, 0.25 g) was mixed to homogeneity with 2.00 g of Tinuvin 123, 0.20 g of Tinuvin 1130, 0.10 g of Tinuvin 328 and added to 7.45 g of Nazdar Clear 246660. The corresponding unstabilized formulations of the blue (compound VII) and red (compound XII) photochrome were prepared by mixing 0.25 g of either the blue or the red photochrome with 9.75 g of the Nazdar 246660. Adequate quantities of each of the four mixes were applied to a silk screen (#83 mesh) and printed on a 30 mil thick translucent polyurethane/polyacrylate substrate. The coating was cured at 120° C. for 2 minutes in an oven. Photochromism of the articles was confirmed for all the printed articles and their stability determined in the Q-U-V Accelerated Weathering Tester. The results indicate an 8.2 fold increase in stability for the blue spiro-indolino-oxazine formulation and a 1.6 fold stability enhancement for the naphthopyran formulation when the appropriate light stabilizer and UV absorbers are incorporated.

TABLE 4

| Formulation | Q-U-V Stability (hours) | Stability Factor |
| --- | --- | --- |
| Unstabilized VII (blue) | 30 | 1.0 |
| Stabilized VII (blue) | 245 | 8.2 |
| Unstabilized XII (red) | 123 | 1.0 |
| Stabilized XII (red) | 191 | 1.6 |

EXAMPLE 5: Polyether Formulation

In a similar manner to that outlined in Example 3, the following stabilized formulations were prepared: blue photochrome (compound VII, 0.25 g) was mixed to homogeneity with 2.00 g of Tinuvin 292, 0.20 g of Tinuvin 1130, 0.10 g of Tinuvin 328 and added to 7.45 g of Nazdar Clear 9626 (Naz-Dar, Chicago, Ill.), a polyester host material. Also, the red photochrome (.compound XII, 0.25 g) was mixed to homogeneity with 2.00 g of Tinuvin 123, 0.20 g of Tinuvin 1130, 0.10 g of Tinuvin 328 and added to 7.45 g of Nazdar Clear 9626. The corresponding unstabilized formulations of the blue (compound VII) and red (compound XII) photochrome were prepared by mixing 0.25 g of either the blue or the red photochrome with 9.75 g of the Nazdar 9626. Adequate quantities of each of the four mixes were applied to a silk screen (#83 mesh) and printed on a 0.004 inch thick transparent polyester substrate. The coating was cured at 120° C. for 2 minutes in an oven. Photochromism of the articles was confirmed for all the printed articles and their stability determined in the Q-U-V Accelerated Weathering Tester. The results indicate a 10.3 fold increase in stability for the blue spiro-indolino-oxazine formulation and an 8.4 fold stability enhancement for the naphthopyran formulation when the appropriate light stabilizer and UV absorbers are incorporated.

TABLE 5

| Formulation | Q-U-V Stability (hours) | Stability Factor |
| --- | --- | --- |
| Unstabilized VII (blue) | 12 | 1.0 |
| Stabilized VII (blue) | 123 | 10.3 |
| Unstabilized XII (red) | 12 | 1.0 |
| Stabilized XII (red) | 101 | 8.4 |

EXAMPLE 6: Nitrocellulose Formulation

In a similar manner to that outlined in Example 3, the following stabilized formulations were prepared: blue photochrome (compound VIII, 0.25 g) was mixed to homogeneity with 2.00 g of Tinuvin 292, 0.20 g of Tinuvin 1130, 0.10 g of Tinuvin 328 and added to 7.45 g of Nazdar Clear Ill. (Naz-Dar, Chicago, Ill.), an industrial lacquer consisting of nitrocellulose as the host material. Also, the yellow photochrome (compound XI, 0.25 g) was mixed to homogeneity with 2.00 g of Tinuvin 123, 0.20 g of Tinuvin 1130, 0.10 g of Tinuvin 328 and added to 7.45 g of Nazdar Clear Ill. The corresponding unstabilized formulations of the blue (compound VIII) and yellow (compound XI) photochrome were prepared by mixing 0.25 g of either the blue or the yellow photochrome with 9.75 g of the Nazdar Ill. Adequate quantities of each of the four mixes were applied to a silk screen (#83 mesh) and printed on a 0.125 inch thick sanded oak veneer as substrate. The coating was cured at 120° C. for 2 minutes in an oven. Photochromism of the articles was confirmed for all the printed articles and their stability determined in the Q-U-V Accelerated Weathering Tester. The results indicate a 10.6 fold increase in stability for the blue spiro-indolino-oxazine formulation and an 15.4 fold stability enhancement for the naphthopyran formulation when the appropriate light stabilizer and UV absorbers are incorporated.

TABLE 6

| Formulation | Q-U-V Stability (hours) | Stability Factor |
| --- | --- | --- |
| Unstabilized VIII (blue) | 8 | 1.0 |
| Stabilized VIII (blue) | 85 | 10.6 |
| Unstabilized XI (yellow) | 8 | 1.0 |
| Stabilized XI (yellow) | 123 | 15.4 |

EXAMPLE 7: Epoxy/Acrylic/Vinyl Formulation

In a similar manner to that outlined in Example 3, the following stabilized formulations were prepared: purple photochrome (compound VI, 0.25 g) was mixed to homogeneity with 2.00 g of Tinuvin 292, 0.20 g of Tinuvin 1130, 0.10 g of Tinuvin 328 and added to 7.45 g of Nazdar Clear S2-26 (Naz-Dar, Chicago, Ill.), an epoxy/acrylic/vinyl polymeric host material. Also, the yellow photochrome (compound XI, 0.25 g) was mixed to homogeneity with 2.00 g of Tinuvin 123, 0.20 g of Tinuvin 1130, 0.10 g of Tinuvin 328 and added to 7.45 g of Nazdar Clear S2-26. The corresponding unstabilized formulations of the purple (compound VI) and yellow (compound XI) photochrome were prepared by mixing 0.25 g of either the purple or the yellow photochrome with 9.75 g of the Nazdar S2-26. Adequate quantities of each of the four mixes were applied to a silk screen (#83 mesh) and printed on a 0.25 inch thick glass substrate, a 0.010 inch thick aluminum sheet and 0.015 inch thick nickel-plated brass sheet. The coating was cured at 120° C. for 2 minutes in an oven. Photochromism of the articles was confirmed for all the printed articles and their stability determined in the Q-U-V Accelerated Weathering Tester. The results indicate a 1.4 to 19.3 fold increase in stability for formulations when the appropriate light stabilizer and UV absorbers are incorporated.

TABLE 7

| Formulation | Q-U-V Stability (hours) | Stability Factor |
|---|---|---|
| (On Glass) | | |
| Unstabilized VI (purple) | 8 | 1.0 |
| Stabilized VI (purple) | 130 | 16.3 |
| Unstabilized XI (yellow) | 60 | 1.0 |
| Stabilized XI (yellow) | 85 | 1.4 |
| (On Aluminum) | | |
| Unstabilized VI (purple) | 30 | 1.0 |
| Stabilized VI (purple) | 245 | 8.2 |
| Unstabilized XI (yellow) | 72 | 1.0 |
| Stabilized XI (yellow) | 180 | 2.5 |
| (On Nickel-plated Brass) | | |
| Unstabilized VI (purple) | 18 | 1.0 |
| Stabilized VI (purple) | 150 | 8.3 |
| Unstabilized XI (yellow) | 8 | 1.0 |
| Stabilized XI (yellow) | 154 | 19.3 |

EXAMPLE 8: Polyamide Formulation

In a similar manner to that outlined in Example 3, the following stabilized formulations were prepared: blue photochrome (compound VII, 0.25 g) was mixed to homogeneity with 2.00 g of Tinuvin 292, 0.20 g of Tinuvin 1130, 0.10 g of Tinuvin 328 and added to 7.45 g of Nazdar 9826 (Naz-Dar, Chicago, Ill.), an industrial lacquer consisting of polyamide as the host material. Also, the red photochrome (compound XII, 0.25 g) was mixed to homogeneity with 2.00 g of Tinuvin 123, 0.20 g of Tinuvin 1130, 0.10 g of Tinuvin 328 and added to 7.45 g of Nazdar 9826. The corresponding unstabilized formulations of the blue (compound VII) and red (compound XII) photochrome were prepared by mixing 0.25 g of either the blue or the red photochrome with 9.75 g of the Nazdar 9826. Adequate quantities of each of the four mixes were applied to a silk screen (#83 mesh) and printed on a 0.030 inch thick clear polyvinyl chloride (PVC) substrate and a 0.001 inch thick clear polypropylene film. The coating was cured at 120° C. for 2 minutes in an oven. Photochromism of the articles was confirmed for all the printed articles and their stability determined in the Q-U-V Accelerated Weathering Tester. The results indicate a 21.3 fold increase in stability for the blue spiro-indolino-oxazine formulation and an 10.6 fold stability enhancement for the naphthopyran formulation when the appropriate light stabilizer and UV absorbers are incorporated.

TABLE 8

| Formulation | Q-U-V Stability (hours) | Stability Factor |
|---|---|---|
| (On PVC) | | |
| Unstabilized VII (blue) | 8 | 1.0 |
| Stabilized VII (blue) | 170 | 21.3 |

TABLE 8-continued

| Formulation | Q-U-V Stability (hours) | Stability Factor |
|---|---|---|
| Unstabilized XII (red) | 8 | 1.0 |
| Stabilized XII (red) | 85 | 10.6 |
| (On Polypropylene) | | |
| Unstabilized VII (blue) | 8 | 1.0 |
| Stabilized VII (blue) | 170 | 21.3 |
| Unstabilized XII (red) | 8 | 1.0 |
| Stabilized XII (red) | 85 | 10.6 |

EXAMPLE 9: Polycarbonate and PVC Substrates

In a similar manner to that outlined in Example 3, the following stabilized formulations were prepared: blue photochrome (compound VIII, 0.25 g) was mixed to homogeneity with 2.00 g of Tinuvin 292, 0.20 g of Tinuvin 1130, 0.10 g of Tinuvin 328 and added to 7.45 g of Nazdar Clear GV-173 (Naz-Dar, Chicago, Ill.), an epoxy/acrylic/vinyl polymeric host material. Also, the yellow photochrome (compound XI, 0.25 g) was mixed to homogeneity with 2.00 g of Tinuvin 123, 0.20 g of Tinuvin 1130, 0.10 g of Tinuvin 328 and added to 7.45 g of Nazdar Clear GV-173. The corresponding unstabilized formulations of the blue (compound VIII) and yellow (compound XI) photochrome were prepared by mixing 0.25 g of either the blue or the yellow photochrome with 9.75 g of the Nazdar GV-173. Adequate quantities of each of the four mixes were applied to a silk screen (#83 mesh) and printed on a 0.030 inch thick clear polycarbonate substrate and a 0.030 inch thick clear polyvinyl chloride (PVC) sheet. The coating was cured at 120° C. for 2 minutes in an oven. Photochromism of the articles was confirmed for all the printed articles and their stability determined in the Q-U-V Accelerated Weathering Tester. The results indicate a 3.5 to 24.4 fold increase in stability for formulations when the appropriate light stabilizer and UV absorbers are incorporated.

TABLE 9

| Formulation | Q-U-V Stability (hours) | Stability Factor |
|---|---|---|
| (On Polycarbonate) | | |
| Unstabilized VIII (blue) | 14 | 1.0 |
| Stabilized VIII (blue) | 340 | 24.3 |
| Unstabilized XI (yellow) | 48 | 1.0 |
| Stabilized XI (yellow) | 170 | 3.54 |
| (On PVC) | | |
| Unstabilized VIII (blue) | 12 | 1.0 |
| Stabilized VIII (blue) | 293 | 24.4 |
| Unstabilized XI (yellow) | 12 | 1.0 |
| Stabilized XI (yellow) | 85 | 7.1 |

EXAMPLE 10: Vinyl leather Substrate

In a similar manner to that outlined in Example 3, the following stabilized formulations were prepared: blue photochrome (compound VII, 0.25 g) was mixed to homogeneity with 2.00 g of Tinuvin 292, 0.20 g of Tinuvin 1130, 0.10 g of Tinuvin 328 and added to 7.45 g of Nazdar Clear PP-26 (Naz-Dar, Chicago, Ill.), an acrylic and epoxy resin nitrocellulose as the host material. Also, the red photochrome (compound XII, 0.25 g) was mixed to homogeneity with 2.00 g of Tinuvin 123, 0.20 g of Tinuvin 1130, 0.10 g of Tinuvin 328 and added to 7.45 g of Nazdar Clear PP-26. The corresponding unstabilized formulations of the blue (compound VII) and red (compound XII) photochrome were prepared by mixing 0.25 g of either the blue or the red photochrome with 9.75 g of the Nazdar PP-26. Adequate quantities of each of the four mixes were applied to a silk screen (#83 mesh) and printed on a 0.25 inch thick artificial vinyl leather substrate. The coating was cured at 120° C. for 2 minutes in an oven. Photochromism of the articles was confirmed for all the printed articles and their stability determined in the Q-U-V Accelerated Weathering Tester. The results indicate a 14.2 fold increase in stability for the blue spiro-indolino-oxazine formulation and an 1.7 fold stability enhancement for the naphthopyran formulation when the appropriate light stabilizer and UV absorbers are incorporated.

TABLE 10

| Formulation | Q-U-V Stability (hours) | Stability Factor |
| --- | --- | --- |
| Unstabilized VII (blue) | 12 | 1.0 |
| Stabilized VII (blue) | 170 | 14.2 |
| Unstabilized XII (red) | 101 | 1.0 |
| Stabilized XII (red) | 170 | 1.7 |

EXAMPLE 11: Acid-Free Paper Substrate

In a similar manner to that outlined in Example 3, the following stabilized formulations were prepared: blue photochrome (compound VII, 0.25 g) was mixed to homogeneity with 2.00 g of Tinuvin 292, 0.20 g of Tinuvin 1130, 0.10 g of Tinuvin 328 and added to 7.45 g of Wilflex® MCV-FF Base (Flexible Products, Kennesaw, Ga.), a clear polyvinyl chloride plastisol, as the host material. Also, the red photochrome (compound XII, 0.25 g) was mixed to homogeneity with 2.00 g of Tinuvin 123, 0.20 g of Tinuvin 1130, 0.10 g of Tinuvin 328 and added to 7.45 g Wilflex® MCV-FF. The corresponding unstabilized formulations of the blue (compound VII) and red (compound XII) photochrome were prepared by mixing 0.25 g of either the blue or the red photochrome with 9.75 g of the Wilflex® MCV-FF. Adequate quantities of each of the four mixes were applied to a silk screen (#156 mesh) and printed on 0.010 inch thick acid-free paper (Canson). The coating was cured at 120° C. for 2 minutes in an oven. Photochromism of the articles was confirmed for all the printed articles and their stability determined in the Q-U-V Accelerated Weathering Tester. The results indicate an 11.9 fold increase in stability for the blue spiro-indolino-oxazine formulation and a 17.5 fold stability enhancement for the naphthopyran formulation when the appropriate light stabilizer and UV absorbers are incorporated.

TABLE 11

| Formulation | Q-U-V Stability (hours) | Stability Factor |
| --- | --- | --- |
| Unstabilized VII (blue) | 8 | 1.0 |
| Stabilized VII (blue) | 140 | 11.9 |
| Unstabilized XII (red) | 8 | 1.0 |
| Stabilized XII (red) | 95 | 17.5 |

EXAMPLE 12: Paper Substrate

In a similar manner to that outlined in Example 3, the following stabilized formulations were prepared: blue photochrome (compound VIII, 0.25 g) was mixed to homogeneity with 2.00 g of Tinuvin 292, 0.20 g of Tinuvin 1130, 0.10 g of Tinuvin 328 and added to 7.45 g of UVF 9200 (Nobel Printing Ink, Placentia, Calif.), a UV-cured acrylic flexographic ink, as the host material. Also, the yellow photochrome (compound XI, 0.25 g) was mixed to homogeneity with 2.00 g of Tinuvin 123, 0.20 g of Tinuvin 1130, 0.10 g of Tinuvin 328 and added to 7.45 g of UVF 9200. The corresponding unstabilized formulations of the blue (compound VIII) and yellow (compound XI) photochrome were prepared by mixing 0.25 g of either the blue or the yellow photochrome with 9.75 g of the UVF 9200. Adequate quantities of each of the four mixes were applied to a silk screen (#83 mesh) and printed on a 0.003 inch thick paper cash register receipt substrate. The coating was cured by exposure to three 15 watt G15T8 UV Germicidal lamps (General Electric). Photochromism of the articles was confirmed for all the printed articles and their stability determined in the Q-U-V Accelerated Weathering Tester. The results indicate a 1.2 fold increase in stability for the blue spiro-indolino-oxazine formulation and an 10.2 fold stability enhancement for the naphthopyran formulation when the appropriate light stabilizer and UV absorbers are incorporated.

TABLE 12

| Formulation | Q-U-V Stability (hours) | Stability Factor |
| --- | --- | --- |
| Unstabilized VIII (blue) | 10 | 1.0 |
| Stabilized VIII (blue) | 12 | 1.2 |
| Unstabilized XI (yellow) | 8 | 1.0 |
| Stabilized XI (yellow) | 80 | 10.0 |

Although certain embodiments and examples have been used to describe the present invention, it will be apparent to those skilled in the art that changes to the embodiments and examples shown may be made without departing from the scope or spirit of the invention.

What is claimed is:

1. A photochromic composition having enhanced light fatigue resistance comprising:

(a) a napthopyran photochrome; and (b) a hindered aminoether light stabilizer.

2. The photochromic composition of claim 1 wherein said naphthopyran has the general structural formula (IX):

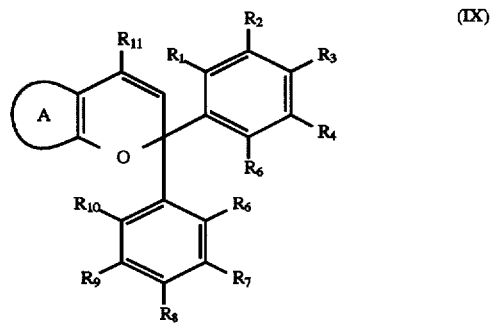

wherein:

$R_1$ to $R_{11}$ are independently selected from the group consisting of: hydrogen;

a linear or branched $C_1$–$C_5$ alkyl group optionally substituted with from 1 to 5 halogen atoms chosen from the group consisting of fluorine, chlorine, bromine and iodine, a hydroxy, $C_1$–$C_5$ alkoxy group or $C_1$–$C_5$ carboxy alkyl group, a cyano or nitro group;

a $C_2$–$C_5$ alkenyl group;

a phenyl, biphenyl, naphthyl or benzyl group;

a halogen atom chosen from from the group consisting of fluorine, chlorine, bromine and iodine;

an amino group, a monoalkyl ($C_1$–$O_5$) amino group, a di-alkyl ($C_1$–$C_5$) amino group, or a cyclo-alkyl ($C_3$–$C_{10}$) amino group;

a piperidine, piperazine or morpholine group;

a carboxyl group, a carboxy alkyl ($C_1$–$C_5$) group, a carboxy alkenyl ($_2$–$C_5$) group;

a carboxamide group, a substituted carboxamide N-alkyl ($C_1$–$C_5$) group, or a substituted carboxamide N,N-di-alkyl ($C_1$–$C_5$) group; and a sulfonic group, a ($C_1$–$C_5$) alkyl sulfonic group, or an aryl sulfonic group chosen from the group consisting of benzene sulfonic, p-toluene sulfonic, and p-chlorotoluene sulfonic groups;

A represents an arenic polycyclic group of formula (X):

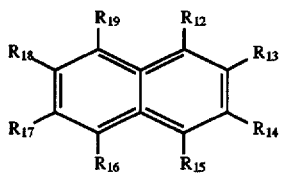

(X)

wherein two contiguous points from $R_{12}$ to $R_{15}$ represent the condensation position between the pyran nucleus in the general formula (IX) and the other two groups in addition to $R_{16}$–$R_{19}$ have the same meaning as $R_1$–$R_{11}$ in the general formula (IX).

3. The photochromic composition of claim 2 wherein in formula (IX):

$R_1$ and $R_2$ are independently selected from the group consisting of a methyl group, an ethyl group, a propyl group, and a phenyl group, or together with the carbon atom to which they are connected, jointly represent a cyclohexyl group;

$R_3$ is selected from the group consisting of methyl, ethyl, propyl, phenyl, benzyl, 2-allyl, 2-hydroxyethyl and 2-carboxymethylethyl groups;

$R_4$ to $R_7$ are independently selected from the group consisting of hydrogen, fluorine, chlorine, bromine, methyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro and phenyl groups;

$R_8$ is selected from the group consisting of hydrogen, chlorine, methyl, phenyl, and methoxy groups;

A is one of the groups with formula (II), (III), (IV) or (V)

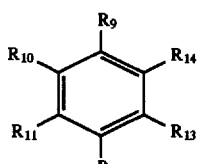

(II)

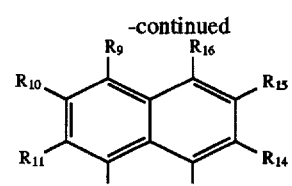

(III)

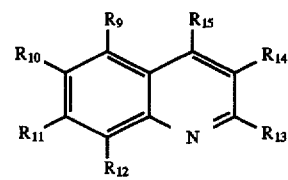

(IV)

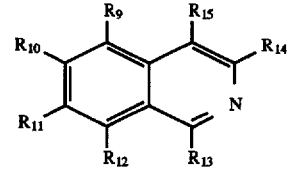

(V)

wherein:

two contiguous points from $R_9$ to $R_{12}$ represent the condensation position between the oxazinic nucleus in the general formula (I) and the other two groups in addition to $R_{13}$–$R_{16}$ $R_7$ are independently selected from the group consisting of hydrogen, fluorine, chlorine, bromine, methyl, ethyl, propyl, isopropyl, trifluoromethyl, hydroxymethyl, benzyl, hydroxy, methoxy, amino, piperidino, morpholino, carboxyl, carboxymethyl, N,N-dimethylcarboxamide, cyano, nitro and phenyl groups.

4. The photochromic composition of claim 3 wherein said napthopyran is selected from the group consisting of:

3,3-diphenyl-3H -naphtho[2,1-b]pyran (XI);

3-(2-fluorophenyl)-3-(3-methyl-4-methoxyphenyl)-5-acetoxy-3H-naphtho[2,1-b]pyran (XII);

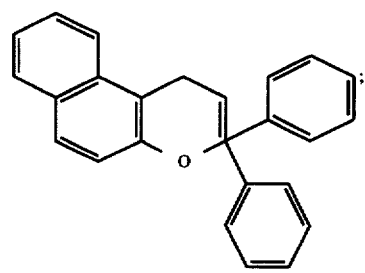

(XI)

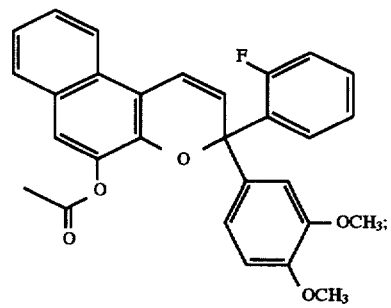

(XII)

3(2-fluorophenyl)-3(4-methoxyphenyl)-3H-naphtho[2,1-b]pyran;

3(2-fluorophenyl)-3(4'-methoxyphenyl)-8-methoxy-3H-naptho[2,1-b]-pyran;

3(2,4-dimethoxyphenyl)-3,4'-methoxyphenyl)-3H-naphtho[2,1-b]-pyran;

3(2-fluorophenyl-3(3,4-dimethoxyphenyl)3H-naphtho[2,1-b]pyran;

3(2-methyl-4-methoxyphenyl)-3(4-methoxyphenyl)-3H-naphtho[2,1-b]pyran;

3(2-methylphenyl)-3(4-methoxyphenyl)-3H-naphtho[2,1-b]pyran;

3-phenyl-3(2,4-dimethoxyphenyl)-3H-naphtho[2,1-b]pyran; and

3(2,6-difluorophenyl)-3(4-methoxyphenyl)-3H-naphtho[2,1-b]-pyran.

5. The photochromic composition of claim 1 wherein said hindered aminoether light stabilizer is a compound of formula (XIVa) or (XIVb):

(XIVa)

(XIVb)

wherein:

$R_1$ is selected from the group consisting of a hydrogen atom; a linear or branched alkyl ($C_1$–$C_{10}$) group; and a phenyl group;

$R_2$ to $R_5$, are independently selected from the group consisting of
  a hydrogen atom;
  a linear or branched $C_1$–$C_5$ alkyl group optionally substituted with from 1 to 5 halogen atoms chosen from fluorine, chlorine, bromine or iodine,
  a hydroxy or $C_1$–$C_5$ alkoxy group;
  a ($C_1$–$C_5$) alkyl sulfonic group;
  an aryl sulfonic group chosen from benzene sulfonic, p-toluene sulfonic, and p-chlorotoluene sulfonic groups; and
  an aryl group chosen from phenyl, biphenyl, and naphthyl groups; and $R_6$ represents
  a hydrogen atom,
  a $C_1$–$C_4$ acyl group,
  a linear or branched alkyl ($C_1$–$C_{16}$) group optionally substituted with from 1 to 5 halogen atoms chosen from fluorine, bromine and iodine,
  a hydroxy, acyloxy group, or alkoxy group;
  a ($C_1$–$C_5$) alkyl sulfonic group or an aryl sulfonic group chosen from benzene sulfonic, p-toluene sulfonic, and p-chlorotoluene sulfonic groups;
  an aryl group chosen from phenyl, biphenyl, naphthyl groups; and
  a bridging moiety linking the light stabilizer to a polymer or linking the light stabilizer in a dimer, trimer or tetramer structure.

6. The photochromic composition of claim 5 wherein said hindered aminoether light stabilizer is selected from the group consisting of:

bis-(1-octyloxy-2,2,6,6,tetramethyl-4-piperidinyl) sebacate (Tinuvin 123, Ciba-Geigy, Hawthorne, N.Y.) (XVII); and (XVII)

7. The photochromic composition of claim 1 further comprising: (c) a benzotriazole UV absorber.

8. The photochromic composition of claim 7 wherein said benzotriazole UV blocker has the structure (XVIII):

(XVIII)

where:

$R_1$ to $R_4$ are independently selected from the group consisting of hydrogen atom;
  a linear or branched $C_1$–$C_8$ alkyl group optionally substituted with from 1 to 8 substituents selected from the group consisting of a halogen atom chosen from fluorine, chlorine, bromine and iodine; a hydroxyl, carboxyl or amino further substituted by a linking group and optionally terminated in a second hydroxyphenyl benzotriazole group;
  a hydroxy or $C_1$–$C_8$ alkoxy group;
  a ($C_1$–$C_8$) alkyl sulfonic group or an aryl sulfonic group chosen from the group consisting of a benzene sulfonic, p-toluene sulfonic, and p-chlorotoluene sulfonic group; and
  an aryl group chosen from phenyl, biphenyl, naphthyl groups.

9. The photochromic composition of claim 8 wherein said benzotriazole UV blocker is selected from the group consisting of 2-(2H-Benzotriazole-2-yl)-4,6-dipentylphenol (Tinuvin 328, Ciba-Geigy, Hawthorne, N.Y.) (XIX);

Poly (oxy-1,2-ethanediyl), a-(3-(3-(2H-benzotriazol-2-yl)-5-(1,1-dimethylethyl)-4-hydroxyphenyl)-1-oxopropyl)-w-hydroxy (Component of Tinuvin 1130, Ciba-Geigy, Hawthorne, N.Y.) (XX);

Poly (oxy-1,2-ethanediyl), a-(3-(3-(2H-benzotriazole-2-yl)-5-(1,1-dimethylethyl)-4-hydroxyphenyl)-1-oxopropyl-w-(3-(3-(2H-benzotriazol-2-yl)-5-(1,1-dimethylethyl)-4-hydroxyphenyl)-1-oxopropoxy) (Component of Tinuvin 1130, Ciba-Geigy, Hawthorne, N.Y.) (XXI):

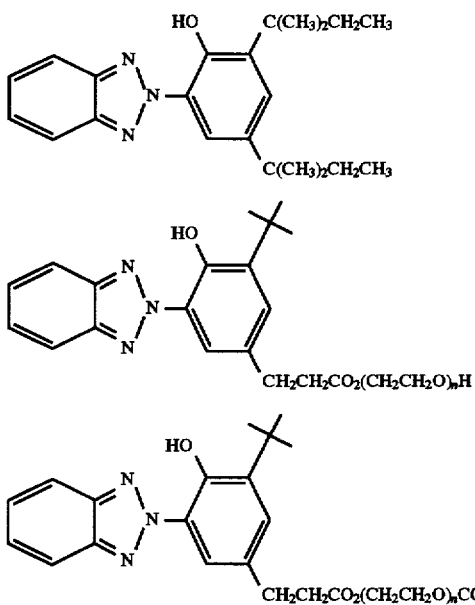

(XIX)

(XX)

(XXI)

10. The photochromic composition of claim 1 formulated in a cellulosic vehicle.

11. The photochromic composition of claim 10 provided on an acrylate substrate.

12. The photochromic composition of claim I formulated in a polyurethane vehicle.

13. The photochromic composition of claim 12 provided on a polyurethane/polyacrylate substrate.

14. The photochromic composition of claim 1 formulated in a polyester vehicle.

15. The photochromic composition of claim 14 provided on a polyester substrate.

16. The photochromic composition of claim 1 formulated in a nitrocellulose vehicle.

17. The photochromic composition of claim 16 provided on a paper and wood substrate.

18. The photochromic composition of claim 1 formulated in an epoxy/acrylic/vinyl vehicle.

19. The photochromic composition of claim 18 provided on a glass, aluminum and nickel substrate.

20. The photochromic composition of claim 1 formulated in an epoxy vehicle.

21. The photochromic composition of claim 20 provided on an aluminum substrate.

22. The photochromic composition of claim I formulated in an acrylic vehicle.

23. The photochromic composition of claim 22 provided on a paper substrate.

24. The photochromic composition of claim 1 formulated in a vinyl acetate vehicle.

25. The photochromic composition of claim 24 provided on a polycarbonate, PVC and synthetic leather substrate.

26. The photochromic composition of claim 1 formulated in an acrylic/epoxy/polyester vehicle.

27. The photochromic composition of claim 26 provided on a vinyl leather substrate.

28. The photochromic composition of claim 1 wherein the weight ratio between the mixture of stabilizers and the photochromic compound ranges between 0.05 and 100.

29. The photochromic composition of claim 28 wherein said weight ratio ranges between 0.1 and 60.

30. The photochromic composition of claim I wherein the weight ratio between the hindered amine and the benzotriazole ranges between 200 and 0.5.

31. The photochromic composition of claim 30 wherein said weight ratio ranges between 30 and 1.

32. The photochromic composition of claim 31 wherein said photochromic composition has a stability factor of at least 3.

33. The photochromic composition of claim 32 wherein said photochromic composition has a stability factor of at least 10.

34. The photochromic composition of claim 33 wherein said photochromic composition has a stability factor of at least 20.

35. A method for making the photochromic composition of claim 1 comprising the step of combining a naphthopyran with a hindered aminoether light stabilizer.

36. A method for making the photochromic compostion of claim 7 comprising the step of combining a napthopyran with a hindered aminoether light stabilizer and a benzotriazole UV absorber.

37. A method of using the photochromic composition of claim I to reduce the transmission of light through a material comprising the step of providing said photochromic composition on or in said material.

* * * * *